(No Model.)

G. F. SENTER.
BEARING FOR MILL SPINDLES.

No. 255,541. Patented Mar. 28, 1882.

Witnesses.

Inventor.

UNITED STATES PATENT OFFICE.

GEORGE F. SENTER, OF NEW YORK, N. Y.

BEARING FOR MILL-SPINDLES.

SPECIFICATION forming part of Letters Patent No. 255,541, dated March 28, 1882.

Application filed June 1, 1881. (No model.)

*To all whom it may concern:*

Be it known that I, GEORGE F. SENTER, of the city, county, and State of New York, have invented a new and useful Improvement in Bearings for Mill-Spindles and other Similar Purposes; and I hereby declare the following to be a full and clear description of the same.

The invention relates to an improved form of constructing the bearings of the spindle, both at the step and collar thereof, by forming the said bearings of rough metallic shells, and filling these shells with a suitable plastic material which will soon indurate into a hard anti-friction bearing, sufficiently hard to resist the wear to which it may be subjected, and sufficiently frictionless in its construction and constitution to obviate the necessity of using any lubricant to facilitate its operation. Suitable arrangements are also made to introduce atmospheric air to the spindle-bearing, so as to insure absolute coolness in running.

The invention will be readily understood by reference to the accompanying drawings, of which—

Figure 1:
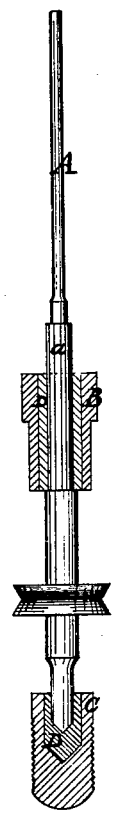
Figure 2:
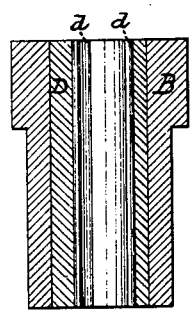
Figure 3:
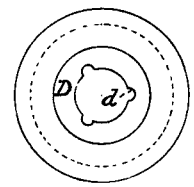
Figure 4:
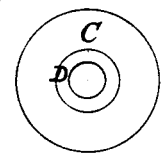

Figure 1 is an elevation of one of the improved spindles with its two bearings shown in section. Fig. 2 is a sectional elevation of the improved bolster-bearing of the spindle, taken separately from the other parts. Fig. 3 is a plan of the bolster-bearing of the spindle, taken separately from the other parts. Fig. 4 is a plan of the step of the spindle.

The spindle A is of the general form of those now in use, except as to the bearing $a$, which is seated in the collar or bolster B, which in this case is made perfectly cylindrical—*i. e.*, of the same size from the top to the bottom of the said bearing, and not larger at the top than at the bottom, as are those now in use, which are made in that conical form for the purpose of allowing the oil or lubricant to feed down into the bearing.

The bolster B and the step C, which have hitherto been turned up true and fitted with great nicety to the spindle, I make simply of common castings, only roughly chambered out inside, and they may be turned up true on the outside, or they may be cast with sufficient accuracy to answer the purpose without being turned up at all. The interior cavities or chambers of these bearing-pieces will be of about twice the diameter of the parts of the spindle or journals they are respectively intended to receive, and these enlarged chambers or cavities will be filled up with bushings D, formed of an anti-friction material, in the following manner. This bushing D is formed of a suitable anti friction material, which may be pressed into the shells B and C in a plastic state, and then allowed to indurate in the required form, so as to provide the requisite bearings or seats for the spindle. These bushings D, I form of a material which will not only stand the great wear to which it will be subjected, but which will also act as an anti-friction bearing to such an extent as to require absolutely no lubrication whatever. The materials I intend to use for this purpose are mica, ground or crushed so as to leave portions of the laminæ in the mass, and finely-ground plumbago, these two elements of the compound to be mixed together in about equal parts by weight, and a fibrous binding material in quantity about equal to both of the above-named elements of the compound, or, in other words, about one part mica, about one part of plumbago, and about two parts of the binding fiber. The binding fiber used for this purpose may be any of the following materials, viz: animal fiber, such as fine hair or wool; vegetable fiber, such as fine flax or jute; or mineral fiber, such as asbestus or mineral wool, either of these materials being for this purpose a full equivalent of the others. These materials are to be thoroughly mixed together, so as to form a homogeneous mass, and softened with as much liquid silicate of soda or silicate of potash as will make the compound into a stiff paste. The material thus prepared will be pressed into the rough shells forming the bearings B and C with a moderately hard pressure, so as to insure a firm and perfect bearing, and then the compound will be allowed to stand and dry, and during the drying process it will become sufficiently hard to withstand great strain and wear, and bearings formed of it will not need any lubricant whatever. The material may be pressed into the shells B and C, so as to fill them solidly, after which the bushing D will be bored out the proper size to fit the spindle or other bearing; or the material may be pressed into the rough case around a finished mandrel, so as to complete the forming of the bushing at the single operation of pressing it into the surrounding case.

In order to insure perfect coolness in spindles or other machinery fitted with these bushings, I cut grooves $d$ in the said bushings, so as to allow atmospheric air to circulate through by the sides of the said bearings. These grooves $d$ should be cut clear through the length of the bushing where it is practicable, as shown in Fig. 2. The number and size of these grooves will of course vary with the size of the bearing to which they will be applied; but for an ordinary silk or cotton spindle there would preferably be about three of the said grooves of, say, one-sixteenth of an inch in size each way. These grooves may be cut straight through the bushing in lines parallel with the axis of the bearing, or they may be placed spirally around the said bearing, so as to facilitate the passage of air through them by reason of the centrifugal action of the journal or spindle, which will tend to draw the air in with it as it revolves.

Having described my invention, I claim—

1. As a new article of manufacture, the spindle or journal bearing B C, formed of rough metallic castings and lined with the anti-friction bushing D, said bushing being formed of a mixture of about one part of ground or crushed mica, one part of ground plumbago, and two parts of a fibrous binding material such as described, together with liquid silicate of soda or silicate of potash sufficient to form the mass into a stiff paste, of which the said bushing D is formed, as described and set forth.

2. The bushing D of a spindle or journal bearing, formed of the plastic anti-friction material, as described, indurated in the surrounding casing B C and provided with air grooves or passages $d$, so as to permit a current of air to flow continuously through the bearing by the side of the journal or spindle, substantially as described and set forth.

3. A journal-bearing or bushing material formed of a mixture of about one part of ground or crushed mica, one part of ground plumbago, and two parts of a fibrous binding material such as described, together with liquid silicate of soda or silicate of potash sufficient to form the mass into a stiff paste, of which the said bearing or bushing is formed, as described and set forth.

G. F. SENTER.

Witnesses:
J. B. THURSTON,
PHILIP E. RAQUÉ.